United States Patent [19]
Kruys et al.

[11] Patent Number: 6,091,967
[45] Date of Patent: Jul. 18, 2000

[54] SCALABLE RADIO PLATFORM

[75] Inventors: Jan P. Kruys, Harmelen; Didier J. R. van Nee, De Meern, both of Netherlands

[73] Assignee: Lucent Technologies Inc., Murray Hill, N.J.

[21] Appl. No.: 08/846,394

[22] Filed: Apr. 30, 1997

[51] Int. Cl.[7] ............................................ H04B 1/38
[52] U.S. Cl. .................... 455/557; 455/419; 455/424; 455/425
[58] Field of Search ............................ 379/556, 557, 379/560; 455/418, 419, 420, 423, 424, 425, 446, 447

[56] References Cited

U.S. PATENT DOCUMENTS

| | | | |
|---|---|---|---|
| 5,297,193 | 3/1994 | Bouix et al. | 379/63 |
| 5,384,845 | 1/1995 | Lopatin et al. | 380/9 |
| 5,420,912 | 5/1995 | Koop et al. | 379/63 |
| 5,797,102 | 8/1998 | Hallikainen et al. | 455/557 |
| 5,809,432 | 9/1998 | Yamashita | 455/557 |
| 5,926,756 | 7/1999 | Piosenka et al. | 455/418 |

FOREIGN PATENT DOCUMENTS

| | | | |
|---|---|---|---|
| 195 26 730 | 2/1996 | Germany | H04M 1/00 |
| 2 282 299 | 3/1995 | United Kingdom | H04Q 7/36 |
| WO 95/23485 | 8/1995 | WIPO | H04Q 7/20 |

*Primary Examiner*—Curtis A. Kuntz
*Assistant Examiner*—Binh K. Tieu
*Attorney, Agent, or Firm*—Claude R. Narcisse

[57] ABSTRACT

A scalable radio platform for wireless communication systems which interfaces with either user equipment or system equipment to allow system parameters to be modified such that users of different communication systems can communicate with each other and also allows a wireless communication system to adapt to changing radio conditions.

17 Claims, 4 Drawing Sheets

SCALABLE RADIO PLATFORM

BACKGROUND OF THE INVENTION

I. Field of the Invention

This invention relates to wireless communication systems and more particularly to a scalable radio platform that enables users of different wireless systems to communicate with each other.

II. Description of the Related Art

Wireless communications has experienced a tremendous growth in the past few years. As a result, there is an ever increasing demand by users to use these systems to convey not only voice signals, but also data signals and video signals. Several wireless communication systems have emerged as accepted standards in various parts of the world. Some of the major wireless communication systems include the Advanced Mobile Phone Service (AMPS), Personal Communication Services (PCS), GSM (Group Speciale Mobile), the High Performance Radio Local Area Network (HIPERLAN) and its U.S. equivalent, Unlicensed National Information Structure (U-NII) systems. Some of these systems are analog systems while others are digital. That is, some of these systems use analog modulation techniques while others use digital modulation techniques. Also, these systems allow their subscribers to access their equipment in different manners. Some systems use Frequency Division Multiple Access (FDMA) schemes while others use Time Division Multiple Access (TDMA) schemes, Code Division Multiple Access (CDMA) or F/TDMA (combination of FDMA and TDMA) schemes.

In addition to having incompatible parameters such as access schemes and modulation techniques, these systems have incompatible bandwidths, frequencies of operation, information transfer rate, and protocols. These are some of the parameters, known as system parameters, which define precisely how subscribers initiate communication, convey information to each other and terminate communication. Therefore, there are barriers for the communication between users of different wireless systems because of incompatible system parameters. With the advent of the Internet, subscribers of communication systems expect and require to have global communication capabilities regardless of their physical location or their particular service provider. Users of wireless communication systems have the same expectations and needs.

Furthermore, new frequency spectrum allocations are being created to satisfy the increasing demand for wireless services. As a result, system parameters (e.g., bandwidth, frequency of operation, transfer rate) are in a state of flux. Consequently, system providers at their great expense, often have to change or modify their system equipment to comply with these changing parameters. Also, factors such as sudden increases in subscriber usage or changing radio signal propagation conditions may effect the performance of the system. Thus, there is also a need by system providers to alter some of their system parameters (e.g., increase or reduce bandwidth, decrease transfer rate to reduce bit error rate) on an as needed basis in order to adapt their system to changing system conditions allowing them to operate their system more efficiently.

FIG. 1 depicts a typical wireless system. FIG. 1 shows a system level diagram of a typical digital cellular wireless system that uses a CDMA scheme. Message Switching Center (MSC) 6 communicates with the Public Switched Telephone Network (PSTN) 2 over bidirectional line 4. MSC 6 communicates with Cell Sites (CS) 12 located in each cell 14 via communication links 8. Each cell 14 is depicted as a hexagon which is a symbolic representation of the geographic terrain or physical area that is being served by a cell site. The cell can be represented with the use of other geometric shapes. Within each cell 14 are a plurality of mobile users 10 who communicate with each other, with users of other cells and with users within PSTN 2. Cell sites 12 communicate with mobile users 10 within each cell via wireless communication links 16. The Cell sites 12 typically contain (among other devices) a communication controller (not shown) that transmits, processes and/or receives information signals from either the users of the system, the MSC or other system equipment. User information signals are typically in the form of analog or digital voice signals, video signals or digital data signals. The system information signals are similarly represented and are used by the system equipment to monitor, control and operate the overall system. Wireless communication links 16 actually comprise two channels (not shown). One channel, commonly referred to as the system channel, is used to convey system information signals between mobile users 10 and cell sites 14. The other channel, commonly referred to as the traffic channel, is used to convey user information signals between the mobile users 10 and cell sites 14. The system is designed so that only mobile users who have subscribed to the system and who are located within one of the cells can use the system.

SUMMARY OF THE INVENTION

The present invention provides a scalable radio platform for a wireless communication system. The communication system has host equipment that use information signals to communicate with other host equipment. The scalable radio platform, which is interfaced to one of the host equipment, uses system parameter data received from the host equipment to enable the host equipment to communicate with different communication systems. Also, the scalable radio platform enables the communication system to modify its performance to adapt to changing system conditions.

The scalable radio platform comprises a control element interfaced to the host equipment where the control element is configured to exchange system parameter data with the host equipment. The control element generates control signals based on the system parameter data. The scalable radio platform further comprises at least one component that is interfaced to the host equipment and configured to communicate with the host equipment with information signals. The component is also interfaced to the control element and configured to receive the control signals and process the information signals in accordance with the received control signals.

DETAILED DESCRIPTION

Figure 2:
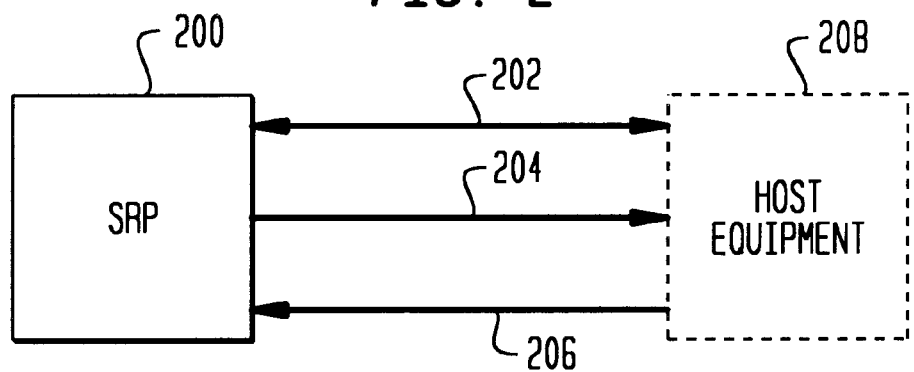
FIG. 2 is a block diagram of the present invention interfaced to host equipment of a wireless communication system.

Referring now to the drawings in which like reference numerals identify similar or identical elements, FIG. 2 shows Scalable Radio Platform (SRP) 200 interfaced to host equipment 208. Host equipment 208 is typically part of a wireless communication system that has host equipment which communicate with other host equipment with information signals. That is, various host equipment transmit and or receive information signals to and from other host equipment. The information signals comprise user information signals and system information signals. Host equipment 208, can be either system equipment (e.g., a cell site communication controller, or other network equipment), or user equipment (e.g., a user communication device, a human operated cellular phone, a portable computer). A user communication device can be, for example, a facsimile machine, a modem or any other communication device that is used by a user to transmit and/or receive information signals in a wireless communication system. Information signals which have been processed by SRP 200 are transferred to host equipment 208 over interface 204. Information signals to be processed by SRP 200 are received by way of interface 206.

Typically, host equipment 208 has a set of system parameter data which dictate how the information signals are to be processed by SRP 200 and also define how SRP 200 in conjunction with host equipment 208 is to communicate with other host equipment or other communication devices that have the same system parameters as host equipment 208. The data associated with the system parameters are exchanged between SRP 200 and host equipment 208 over interface 202. This data, which shall henceforth be referred to as system parameter data, can be stored by SRP 200. Host equipment 208 may, for example, have the following set of parameters that are used in communicating with another device: 1. System operating frequency (f) 2. System bandwidth (b) 3. System Transfer Rate (t) and 4. System protocol (p). This list of parameters is merely illustrative and is by no means comprehensive. Additional parameters or a different set of parameters can be used to define how a communication system processes its information signals and thus communicate with other communication devices.

SRP 200 has the capability to store system parameter values and settings and, based on such data, possibly modify the way it processes the information signals. SRP 200 also has the capability to store the received system parameter data and change the stored system parameter data based on the received system parameter data. Users having an SRP interfaced to their equipment, such as a cellular phone, have the capability to use a number of different wireless communication systems and are no longer constrained by their particular physical location. Similarly, service providers of wireless systems with an SRP interfaced to their system equipment can thus serve users with incompatible system parameters and are able to modify the performance of their system to adapt to changing system conditions. Although FIG. 2 shows SRP 200 interfaced to only one host equipment, it will be understood by one of ordinary skill in the art to which this invention belongs that SRP 200 can be interfaced to more than one host equipment.

Figure 3:
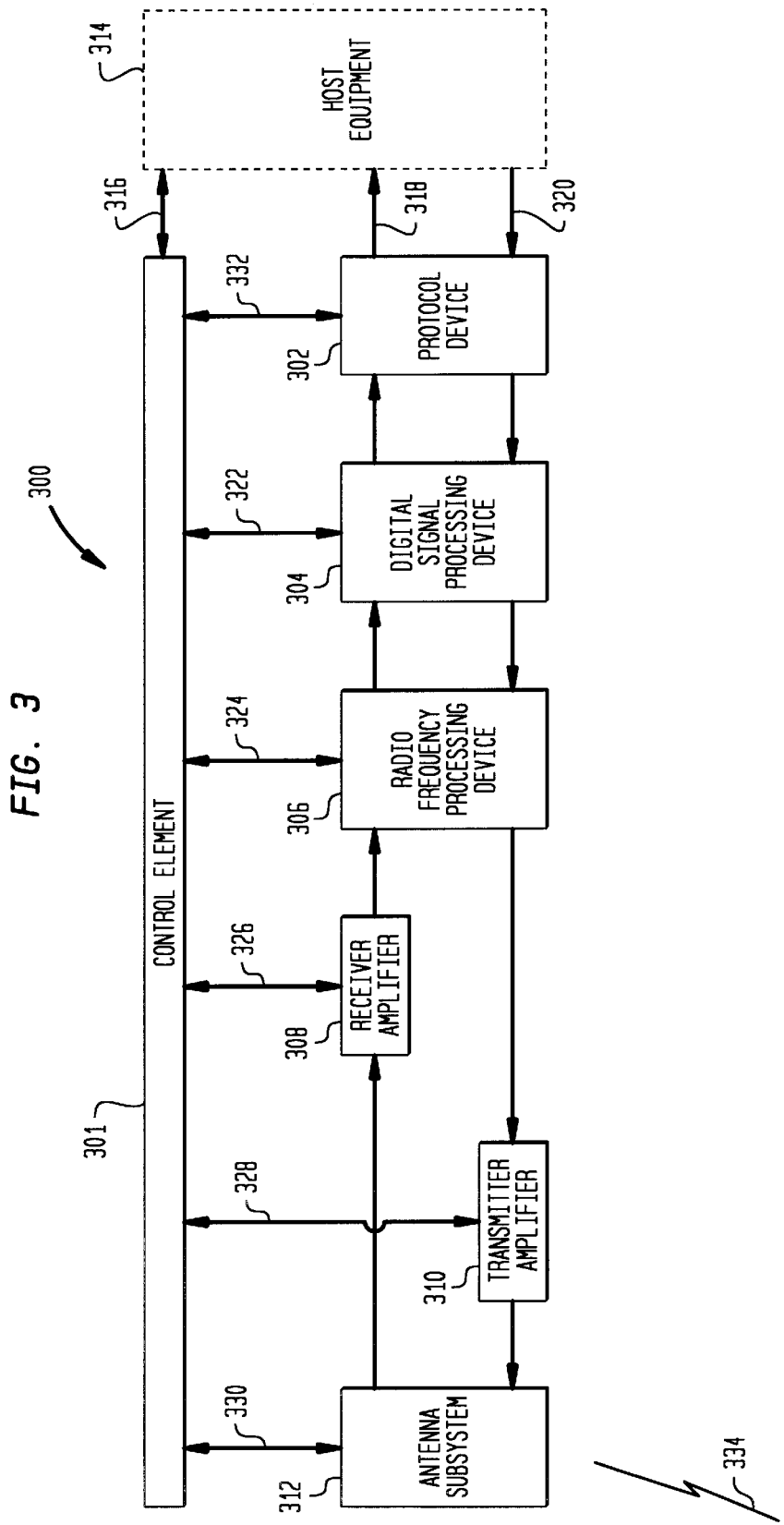
FIG. 3 is a detailed block diagram of the present invention.

FIG. 3 shows a more detailed block diagram of the Scalable Radio Platform interfaced to host equipment 314. Control element 301 of SRP 300 exchanges system parameter data with host equipment 314 via interface 316. Control element 301 generates control signals based on the system parameter data received from host equipment 314 and transmits these control signals over interfaces 330, 328, 326, 324, 322 and 332 to various components of SRP 300. Information signals to and from host equipment 314 are conveyed over interfaces 318 and 320 respectively. Information signals in the form of radio signals are received and transmitted to and from wireless link 334. Wireless link 334, depending on the particular communication system, may be used to convey both user information signals and system information signals as is typical in wireless communication systems. The interfaces are conduits through which control signals, status signals, system parameter data and information signals are conveyed. These interfaces can be electrical wire connections, optical fiber connections, optoelectronic devices or any other well known electronic interface circuitry.

As previously stated, the control signals are based on the system parameter data. The control signals can be electrical, electronic, electromechanical, optical or any other type of signal typically used to activate in some manner electrical circuitry or devices. The components process the information signals in accordance with the control signals received from control element 301. The components of SRP 300 comprise Antenna Subsystem 312, Receiver amplifier 308, Transmitter amplifier 310, Radio Frequency Processing device 306, Digital Signal Processing device 304 and Protocol device 302. The above list of components represents devices that are typically used in communication systems to process information signals. Other components which also process information signals in communication systems can also be made part of SRP 300. The system parameter data is stored in control element 301. Also, the components send status signals to control element 301 over their respective interfaces in response to received control signals. The status signals have the same or similar characteristics to those of the control signals. Control element 301 may want to determine the current state of a particular component. Control element 301 may, for example, transmit control signals to a component to cause said component to transmit status signals over its interface to inform control element 301 of the current state of that component.

Each component can be implemented with programmable circuitry that is well known in the art of programmable electronics allowing it to modify the manner in which it processes information signals in response to control signals received from control element 301. Each component can also be implemented with standard circuitry whose electrical response and performance can be modified directly by the control signals. These types of modifiable circuits are well known in the art of electronic and electrical circuit design.

Control element 301 can be implemented as a microprocessor based circuit with memory circuits (not shown) that are used to store received system parameter data. Part of the control element's memory circuit can have firmware that analyze the incoming system parameter data and generate the proper control signals as a function of the latest system parameter data. The firmware may be able to also detect circumstances in which several system parameters have to be modified in response to a change in one or more system parameter.

The memory circuit of control element 301 may have stored a plurality of system parameter sets that are acceptable standard values for various well known systems or networks. The control element may, for example, provide assistance to host equipment 314 in establishing the system parameter data to be used by SRP 300. For example, control element may receive system parameter data that changes the current protocol setting. However, the new protocol setting may not be operable at the current transfer rate and bandwidth. The control element's firmware would detect this situation by comparing the incoming system parameter data with the stored system parameter data and change the transfer rate and bandwidth to proper settings and values to achieve the performance mandated by the received system parameter data. The control element's firmware may contain several algorithms that determine not only whether a received set of system parameter data is compatible to known systems but also whether such a set of system parameter data is even achievable based on basic communication principles. Control element 301 can, on its own or upon the request of host equipment 314, transmit its current set of stored system parameter data to host equipment 314 by way of interface 316. The design of control element 301 is not limited to the particular implementation described above. Other realizations of control element 301, which perform in the same manner, can be created.

Still referring to FIG. 3, antenna subsystem 312 can be implemented as an array of antennae each one of which can be selected by control element 301 based on received system parameter data. That is, control element 301 transmits control signals over interface 330 to antenna subsystem 312 to activate the appropriate antenna from the set of antennae. The selected antenna receives information signals in the form of radio signals transmitted over wireless link 334 which are then transferred to receiver amplifier 308. The selected antenna also receives information signals from transmitter amplifier 310 and converts the information to radio signals that are transmitted over wireless link 334.

Receiver amplifier 308 and transmitter amplifier 310 are set at their proper operating frequency and amplification values due to control signals received from control element 301 via interfaces 326 and 328 respectively. It is well known in the art of electronic circuit design to implement amplifiers that can change their amplification value and frequency of operation in response to received control signals. Receiver amplifier 308 receives information signals from antenna subsystem 312 and applies the proper amplification and frequency response to these signals. The output of amplifier 308 is transferred to radio frequency processing device 306. Transmitter amplifier 310 receives information signals from radio frequency processing device 306. Transmitter amplifier 310 applies the proper amplification and frequency response to these information signals and transfers them to antenna subsystem 312.

Control element 301 transmits control signals related to frequency of operation to radio frequency processing device 306 via interface 324. Radio frequency processing device 306 receives modulated baseband signals from digital signal processing device 304. Radio frequency processing device 306 may, for example, be implemented as a mixer-amplifier which has a local oscillator at one of its inputs; the local oscillator being variable or programmable such that it can oscillate at any one of a plurality of frequencies in response to a control signal. Radio frequency processing device 306 implemented as a variable mixer amplifier or similar circuitry would be able to convert baseband signals to various radio frequency signals. The baseband signals are shifted up in frequency and are located within a certain bandwidth defined by the system bandwidth parameter. Also, radio frequency processing device 306 receives high frequency signals from receiver amplifier 308. These high frequency signals are downshifted to baseband signals and are then transferred to digital signal processing device 304.

Digital signal processing device 304 receives control signals associated with bandwidth and transfer rate from control element 301 over interface 322. Digital signal processing device 304 modulates baseband signals received from protocol device 302. The modulation scheme used by this device ensures that the baseband signals are properly limited by the bandwidth and transfer rate set by the system. Digital signal processing device 304 also receives modulated baseband signals from radio frequency processing device 306. These signals are demodulated and then transferred to protocol device 302. Digital signal processing device 304 is designed so that the control signals received from control element 301 causes digital signal processing device 304 to modify the responses of its modulator and demodulator circuits (not shown).

Figure 1:
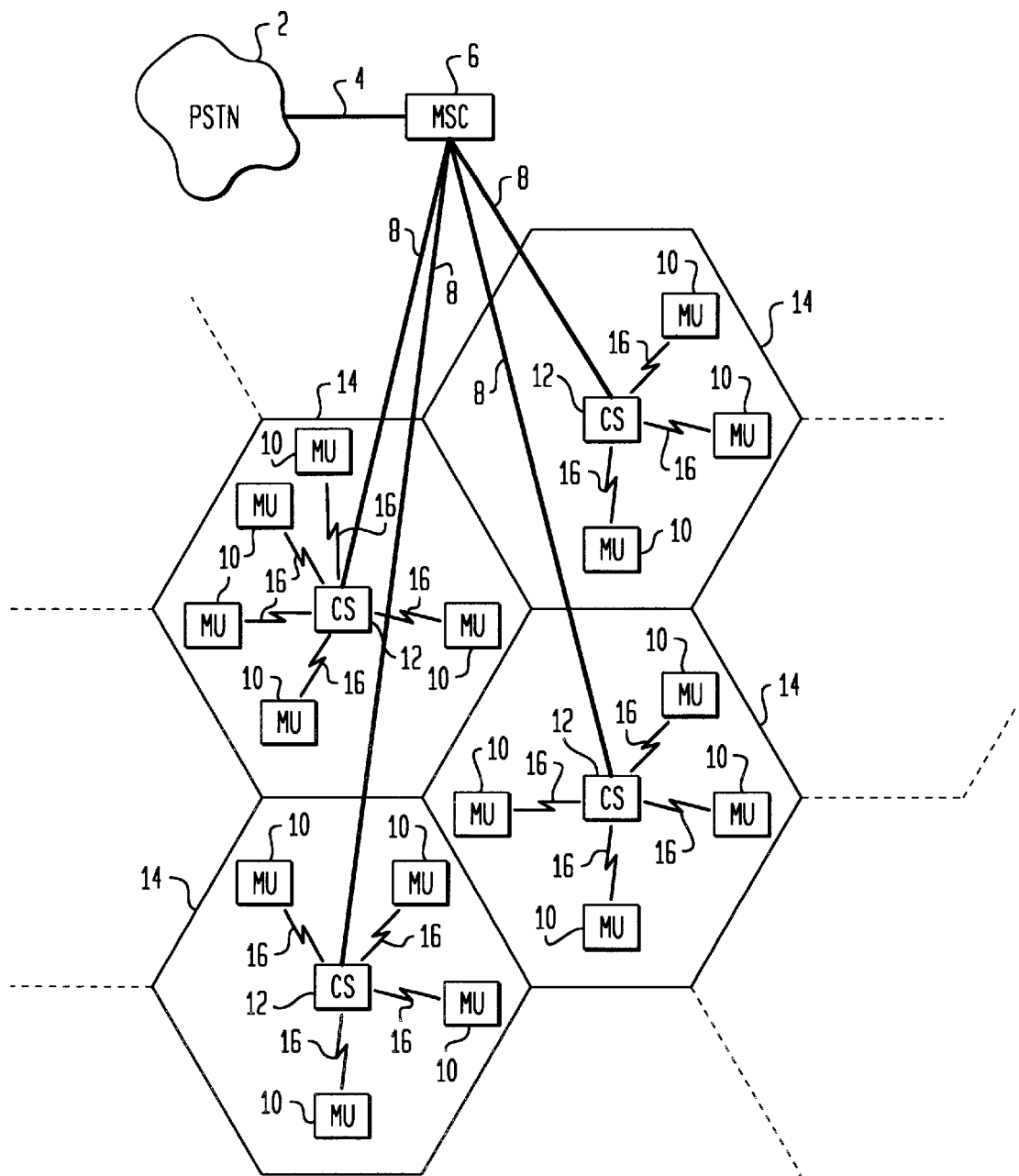
FIG. 1 is a prior art system level diagram of a typical cellular communication system.

Protocol device 302 receives information signals from host equipment 314 via interface 320. Protocol device 302 packages and formats the information signals in accordance with the system protocol. For example a wireless digital cellular system such as the one shown in FIG. 1 may be operated to comply with the well known IS-95A communication protocol which uses a CDMA scheme to enable its users to have access to the system. Protocol device 302 may be designed to implement other multiple access schemes such as TDMA, FDMA or F/TDMA. The information signals are converted to baseband signals by protocol device 302 and transferred to digital signal processing device 304 for modulation. Conversely, demodulated baseband signals from digital signal processing device 304 are transferred to protocol device 302 which processes the signals as per the protocol being used and transfers such signals to host equipment 314 via interface 318. Protocol device 302 may be implemented as a programmable protocol controller which can implement different protocols at different transfer rates in response to control signals received from control element 301 over interface 332. Protocol device 302 can be a microprocessor based circuit with supporting circuitry that can be programmed to accept incoming information signals at a particular transfer rate, package and format said information in accordance with the particular protocol being followed and transmit said information signals to digital signal processing device 304.

Once configured with a specific set of system parameters, SRP 300 in conjunction with host equipment 314 would be able to communicate with another possibly different device that has the same system parameters as host equipment 314. Therefore, as discussed in detail above, information signals originating from host equipment 314 are transferred to SRP 300 via interface 320. The information signals are processed by the various components of SRP 300 and finally are transmitted by antenna subsystem component 312. Similarly, information signals received by antenna subsystem 312 are processed by the remaining components of SRP 300 and transferred to host equipment 314 via interface 318.

As discussed earlier, during communication, the communication system can modify any or all of the system parameters. In this manner, particular parameters may be changed to adapt to local changes in radio conditions. For example, when radio conditions worsen such that excessive transmission errors occur, the bandwidth and or transfer rate may be reduced to achieve improved error performance. Under favorable radio conditions, however, the bandwidth or transfer rate may be increased to allow superior system performance. During communication with another device, host equipment 314 may communicate system information, related to system parameters, with the rest of the communication system. If one or more system parameter needs to be modified, host equipment 314 sends the proper system parameter data to control element 301 over interface 316.

Thus, control element 301 of SRP 300 first receives system parameter data from host equipment 314. Control element 301 generates control signals based on the received system parameter data. Control element 301 transmits these control signals to the components. The components communicate with host equipment 314 or communicate another host equipment via antenna subsystem 312 with information signals and process these information signals in accordance with the system parameter data received from host equipment 3 14 or in accordance with the latest system parameter data stored in control element 301. That is, information signals can be received or transmitted by the components from host equipment 314; information signals can also be transmitted and received by the components to and from host equipment 314. It is, therefore in this manner that SRP 300 can modify the way it processes information signals based on the received system parameter data.

Figure 4:
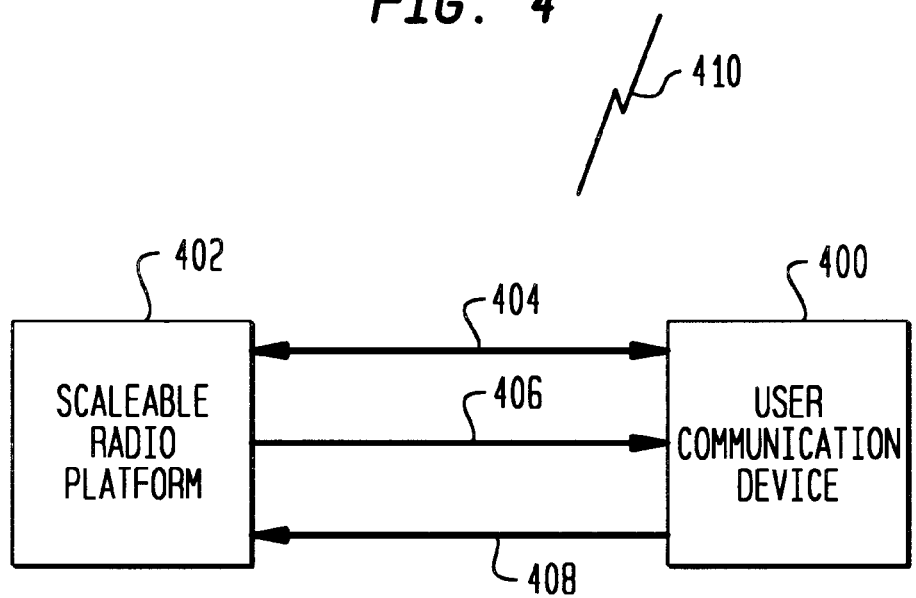
FIG. 4 is a block diagram of the present invention interfaced to a user communication device of a wireless communication system.

FIG. 4 shows SRP 402 interfaced with user communication device 400 of a cellular communication system. User communication device 400 may be a portable personal computer, a cellular phone, an indoor wireless phone, a wireless phone for a wide area network, or other communication device that can be interfaced to an SRP. It should be clear to one of ordinary skill in the art to which this invention belongs that SRP 402 can be integrated within the circuitry or system of user communication device 400. That is, SRP 400 need not be a separate physical device, but can be configured to become part of a user communication device. Thus, for example, SRP 400 can be integrated within the circuitry of a portable personal computer, a cellular phone, an indoor wireless phone etc. User information signals originating from user communication device 400 is transferred to SRP 402 via interface 408. SRP 402 transmits the user information signals over wireless communication channel 410 to a cell site (not shown). Conversely, user information signals received by SRP 402 over wireless communication channel 410 is processed by SRP 402 and then transferred to user communication device 400 via interface 406. SRP 402 and user communication device 400 exchange system information in a similar fashion. An example of a particular application of the system shown in FIG. 4 follows.

If a user of the system shown in FIG. 4 is using a portable personal computer equipped with a wireless modem and appropriate communications software within an indoor wireless communication system to retrieve data from a computer system, the user has more than one way to communicate with the communication system. The computer system can be a database, an operating system through which various application programs can be executed, a home page or web site that is part of the Internet or any other computer system configured to communicate with other computers. The indoor wireless system normally has an operating range within which a user of the system should be located in order to use this system. Suppose that the user is also situated within a cell of a cellular network providing wide area coverage. The indoor wireless system has the following system parameters: (1) $f1=5.25$ GHz; (2) $b1=4$ MHz; (3) $t1=20$ Mbits/s and (4) $p1=$TDMA The cellular network's system parameters are as follows: (1) $f2=2.22$ GHz; (2) $b2=4$ MHz; (3) $t2=2$ Mbits/s and $p2=$CDMA. The computer can be programmed to have both sets of system parameters. When the user is within the boundaries of the indoor wireless system, the computer can also be programmed to provide the SRP with a set of system parameters (i.e., $(f1, b1, t1, p1)$) that is acceptable to the indoor wireless system and establish communication via the indoor wireless communication system. The programming of the computer can be done by the user, by the computer manufacturer or by the software manufacturer of a communication program being executed by the computer.

Once communication is established, the user can for example, start retrieving information from the computer system via the indoor wireless communication system. The user can continue to retrieve data from the computer system as long as the user is within the operating range of the indoor wireless communication system. It may be that the user has to leave the vicinity of the indoor wireless system but still needs to continue to retrieve information from the computer system. In such a circumstance, the user may, for example, terminate temporarily the retrieval of information from the computer system while still within the operating range of the indoor wireless communication system. Once the user is outside the range of the indoor wireless communication system, the user instructs the computer to send to SRP 402 a new set of system parameters containing new system parameter data ($f2, b2, t2, p2$). The SRP can then establish communication with the cellular network and contact the now remote computer system via the cellular network.

In the example above, the set of system parameters for the cellular network was stored in the host equipment (portable personal computer) prior to establishing communication with the network. The user was then able to choose that network by simply causing its host equipment to transfer the new set of system parameter data to its SRP and then establish communication with that network. There may be circumstances where a user is located in an area that is being served by different wireless networks and the user does not know the values and settings of the particular set of parameters for each of the available wireless networks. In such a situation, the host equipment can detect the presence of different wireless networks from data received by the SRP. In order to establish communication with a particular available wireless network, the user can use its host equipment to detect the existence of one or all of the available wireless networks. That is, the user can instruct its host equipment to listen for radio signals of a certain frequency or to perform a search of a band of the frequency spectrum known to be allocated to wireless networks. Typically, cell sites or base stations of wireless networks have radio beacons that transmit signals announcing the presence of a wireless network in a certain geographical area. The beacon signals typically contain system information about that particular network. This is a technique that is well known and widely used in various wireless communication systems.

Hence, networks capable of serving users equipped with SRP based radio devices can, for example, transmit their beacon signals on a well known frequency channel. The networks can use the same methods of modulation and communication protocols for their beacon signals or comply with a prearranged protocol and modulation scheme specifically designed for their area of coverage. The particular method of modulation can be a common method typically used by many wireless networks. Also, the particular protocol used can be a basic protocol that can be easily implemented by many systems. The user communication device or host equipment can then, in conjunction with its SRP, conform to the system parameters or negotiate with the network regarding system parameter values and settings. If a user decides to use the services of a particular network, the user instructs its communication device to transfer the proper parameters of that network to its SRP and then engage in communication with the network. This particular technique is for illustrative purposes only and should not be construed as the only method that can be used to change system parameters. Other procedures may be followed when a user is changing from one wireless communication system to another. It should be noted that the decision to change system parameters may be made by the user or automatically done by the host equipment. The SRP then simply receives the system parameter data originating from the user or host equipment and its components modify the manner in which they process the information signals based on the latest system parameter data.

Figure 5:
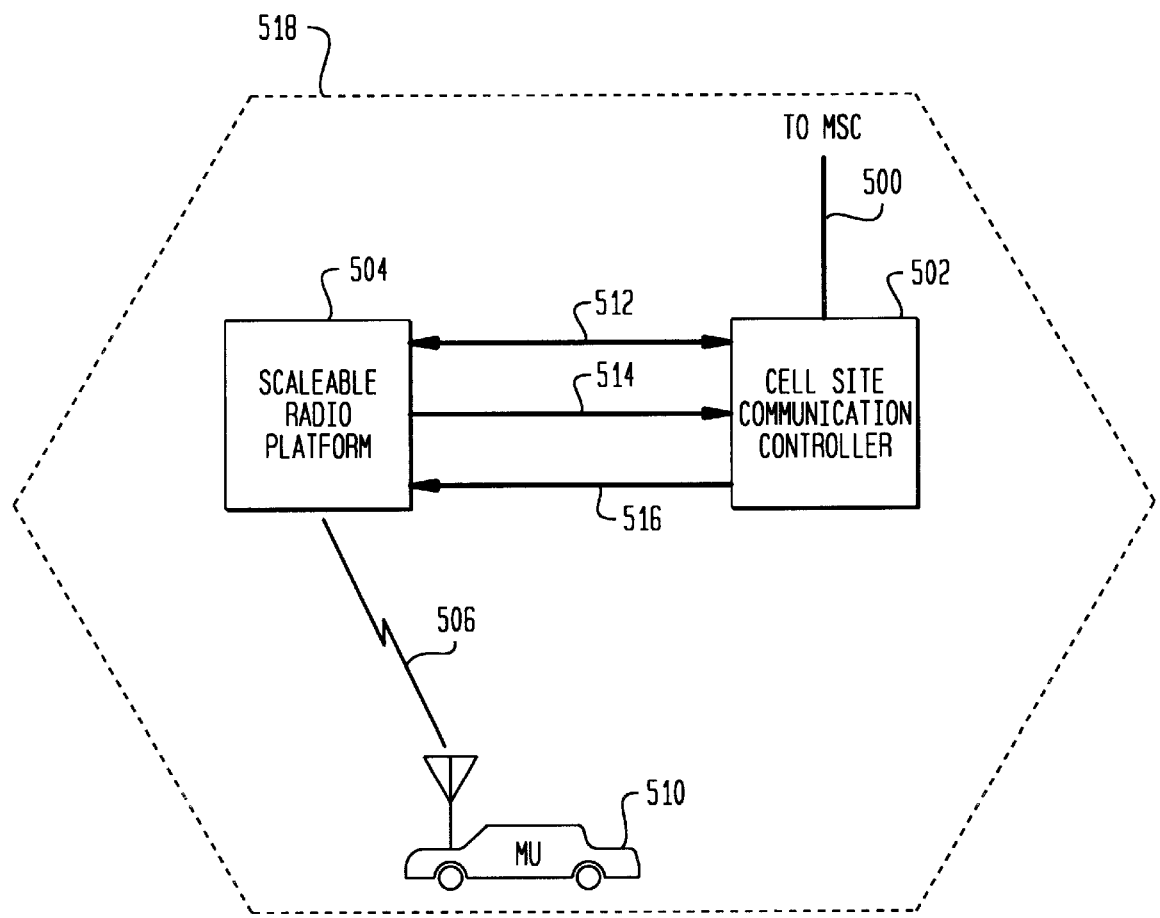
FIG. 5 is a block diagram of the present invention interfaced to a cell site communication controller of a digital cellular wireless communication system.

In FIG. 5 Scalable Radio Platform (SRP) 504 is interfaced to cell site communication controller 502 of a communication system. Cell site communication controller 502 and SRP 504 are located within cell 518 which is part of a digital cellular wireless communication system similar to that shown in FIG. 1. It should be noted that the use of SRP 504 is not limited to digital cellular wireless systems and thus SRP 504 can interface with other types of wireless systems. It should also be noted that SRP 504 can be integrated within the circuitry and system of communication controller 502. SRP 504 allows the communication system to modify or change its system parameters so that the system can serve mobile users 510 which have parameters that are different from the parameters of the system and also enables the system to adapt to changes in radio conditions. Cell site communication controller 502 communicates with an MSC (not shown) over communication link 500 and communicates with a plurality of mobile users 510 over wireless communication link 506. For the sake of clarity, only one mobile user 510 is shown. Wireless communication link 506 may be used as a system channel and a traffic channel. User information signals originating from mobile user 510 are transmitted over wireless link 506 to SRP 504. SRP 504 processes these information signals in accordance with the system parameters and transfers them to cell site communication controller 502 over interface 514. Depending on the destination of the received user information signals, cell site communication controller 502 may transmit the user information signals to the MSC over communication link 500 or transmit (by way of SRP 504) the user information signals over wireless link 506 to another mobile user within cell 518. Conversely, user information signals destined for mobile user 510 and originating from the MSC are received over communication link 500 by cell site communication controller 502. The user information signals are then transferred via interface 516 to SRP 504 which processes the information signals in accordance with the system parameters. SRP 504 then transmits the user information signals to mobile user 510 over wireless link 506. SRP 504 and cell site communication controller 502 exchange system information signals in a similar fashion except that the system information signals are conveyed over wireless link 506. Interface 512 is used by SRP 504 and cell site communication controller 502 to exchange system parameter data. Cell site communication controller 502 can instruct SRP 504 to send its current system parameter data to cell site communication controller 502 over interface 512. Cell site communication controller 502 may then transmit new system parameter data to SRP 504 ensuring that the information signals are processed by SRP 504 in accordance with the new system parameter data.

We claim:

1. A scalable radio platform for a wireless communication system, the wireless communication system has host equipment that use information signals to communicate with other host equipment, the scalable radio platform comprising:

a control element configured to receive and store system parameter data from at least one host equipment, transmit stored system parameter data to the at least one host equipment and generate control signals based on the stored system parameter data;

at least one component interfaced to the at least one host equipment, the at least one component is configured to communicate with the at least one host equipment with information signals, receive the control signals from the control element; and the at least one component being further interfaced to the control element is further configured to generate status signals in response to the received control signals, transmit the status signals to the control element and process the information signals in accordance with the received control signals.

2. The scalable radio platform of claim 1 wherein the at least one component comprises a protocol device.

3. The scalable radio platform of claim 1 wherein the at least one component comprises a digital signal processing device.

4. The scalable radio platform of claim 1 wherein the at least one component comprises a radio frequency processing device.

5. The scalable radio platform of claim 1 wherein the at least one component comprises a receiver amplifier.

6. The scalable radio platform of claim 1 wherein the at least one component comprises a transmitter amplifier.

7. The scalable radio platform of claim 1 wherein the at least one component comprises an antenna subsystem.

8. The scalable radio platform of claim 1 wherein the control element is configured to change the stored system parameter data in response to system parameter data received from the host equipment.

9. A scalable radio platform interfaced to a user communication device, the user communication device uses information signals to communicate with other user communication devices and host equipment of a wireless communication system, the scalable radio platform comprising:

a control element configured to receive and store system parameter data from the user communication device, transmit stored system parameter data to the user communication device and generate control signals based on the stored system parameter data;

at least one component interfaced to the user communication device, the at least one component is configured to communicate with the user communication device with information signals, receive the control signals from the control element; and the at least one component being further interfaced to the control element is further configured to generate status signals in response to the received control signals, transmit the status signals to the control element and process the information signals in accordance with the received control signals.

10. A scalable radio platform interfaced to a cellular phone, the cellular phone uses information signals to communicate with other cellular phones and host equipment of a wireless communication system, the scalable radio platform comprising:

a control element configured to receive and store system parameter data from the cellular phone, transmit stored system parameter data to the cellular phone and generate control signals based on the stored system parameter data;

at least one component interfaced to the cellular phone, the at least one component is configured to communicate with the cellular phone with information signals, receive the control signals from the control element; and the at least one component being further interfaced to the control element is further configured to generate status signals in response to the received control signals, transmit the status signals to the control element and process the information signals in accordance with the received control signals.

11. A scalable radio platform interfaced to a portable personal computer, the portable personal computer uses information signals to communicate with other computers and host equipment of a wireless communication system, the scalable radio platform comprising:

a control element configured to receive and store system parameter data from the portable personal computer, transmit stored system parameter data to the portable personal computer and generate control signals based on the stored system parameter data;

at least one component interfaced to the portable personal computer, the at least one component is configured to communicate with the portable personal computer with information signals, receive the control signals from the control element; and the at least one component being further interfaced to the control element is further configured to generate status signals in response to the received control signals, transmit the status signals to the control element and process the information signals in accordance with the received control signals.

12. A scalable radio platform interfaced to a cell site communication controller used in a digital cellular wireless communication system for communicating with users of the wireless communication system with information signals, the scalable radio platform comprising:

a control element configured to receive and store system parameter data from the cell site communication controller, transmit stored system parameter data to the portable personal computer and generate control signals based on the stored system parameter data;

at least one component interfaced to the cell site communication controller, the at least one component is configured to communicate with the cell site communication controller with information signals, receive the control signals from the control element; and the at least one component being further interfaced to the control element is further configured to generate status signals in response to the received control signals, transmit the status signals to the control element and process the information signals in accordance with the received control signals.

13. A method for conveying information signals and system parameter data between various host equipment of a wireless communication system where one of said host equipment is interfaced to a scalable radio platform comprising a control element interfaced to at least one component, the method comprising the steps of:

receiving the system parameter data from the host equipment;

storing the received system parameter data;

generating control signals based on the received system parameter data;

transmitting the control signal signals to the at least one component;

communicating with the host equipment with information signals; and processing the information signals in accordance with the received control signals.

14. The method of claim 13 wherein the step of transmitting control signals to the at least one component further comprises the step of receiving status signals from the at least one component in response to the transmitted control signals.

15. The method of claim 13 wherein the step of storing the received system parameter data further comprises the step of using the received system parameter data to change the stored system parameter data.

16. The method of claim 13 wherein the step of transmitting the control signals to the at least one component further comprises transmitting stored system parameter data to the host equipment.

17. The method of claim 13 wherein the step of processing the information signals further comprises the step of transmitting status signals to the control element in response to the control signals.

* * * * *